Aug. 30, 1955 — E. J. PANISH — 2,716,474
CLUTCH AND THROTTLE CONTROL FOR ENGINE
Filed Dec. 17, 1949 — 2 Sheets-Sheet 2
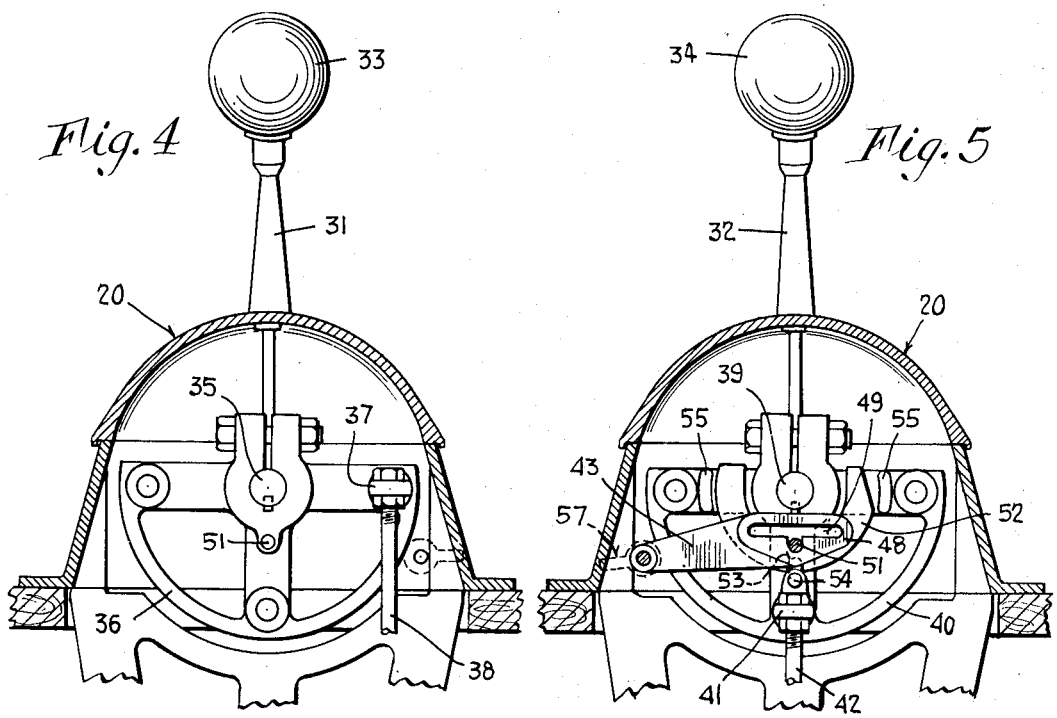
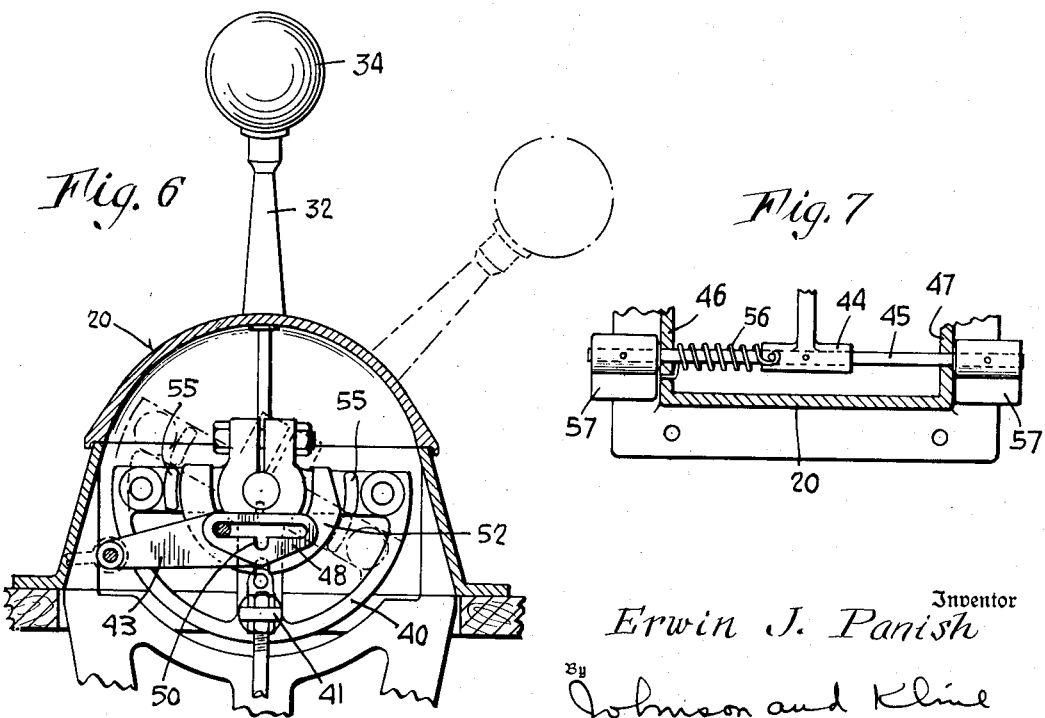
Inventor
Erwin J. Panish
By Johnson and Kline
Attorneys

# United States Patent Office 2,716,474
Patented Aug. 30, 1955

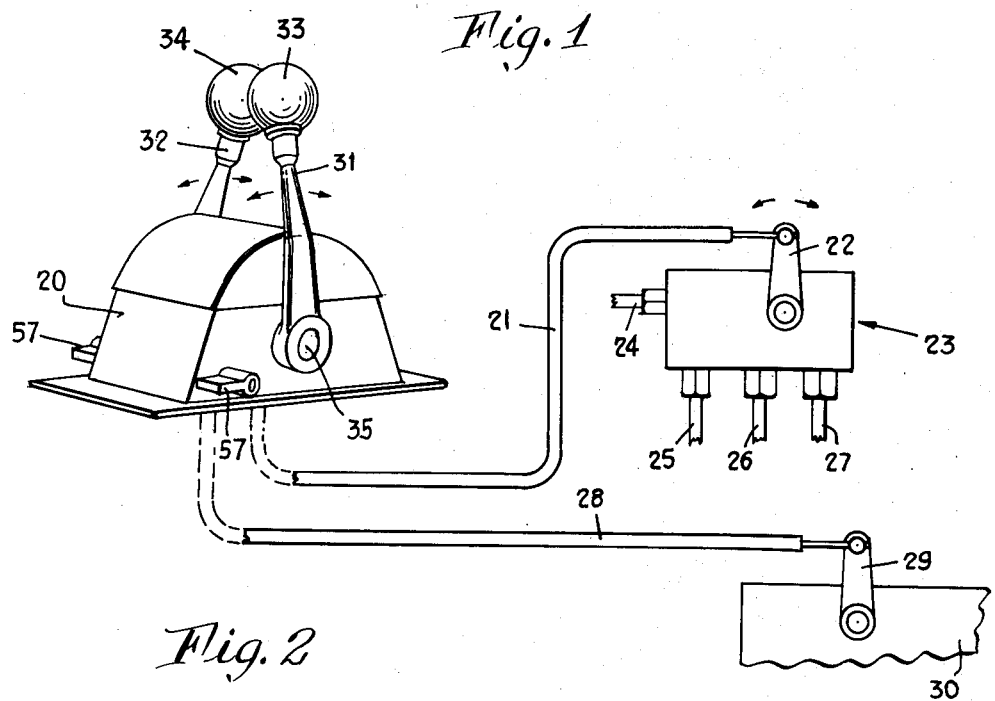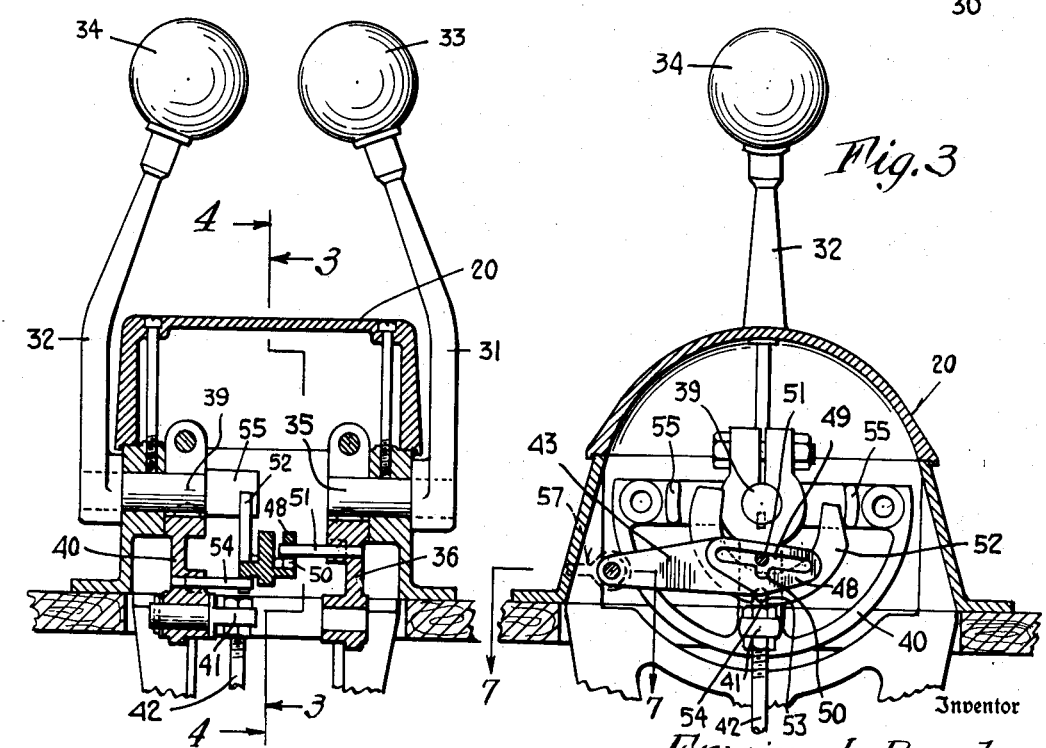

2,716,474

CLUTCH AND THROTTLE CONTROL FOR ENGINE

Erwin J. Panish, Bridgeport, Conn.

Application December 17, 1949, Serial No. 133,623

9 Claims. (Cl. 192—.096)

This invention relates to combined clutch and throttle control devices for use with engines having clutch means associated therewith.

The present invention is shown as applied to a marine-type engine and control system; however it should be understood that the invention is not limited to this particular use, since it has utility and advantage in connection with stationary and other type engines and control systems.

An object of the invention is to provide an improved, wholly mechanical clutch and throttle control device wherein either independent, or simultaneous one-hand unidirectional operation of the clutch and throttle may be had.

Another object of the invention is to provide an improved mechanical interlock mechanism for a combined clutch and throttle control device having separate clutch and throttle members, whereby actuation of the throttle member is readily accomplished whenever the clutch member is in engaged position, but is automatically prevented at all times that the clutch member is in neutral position.

Yet another object of the invention is to provide an improved clutch and throttle control with interlock as set forth above, wherein the lock is manually releasable to free the throttle member with the clutch member in neutral position when this is desired, such release, however, locking the clutch member in its said neutral position.

Still another object of the invention is to provide an improved interlocking clutch and throttle control according to any of the foregoing, which is simple in construction, and sturdy and reliable in use, and is economical to manufacture.

Other features and advantages will hereinafter appear.

In the accompanying drawings:

Figure 1 is a perspective view of the improved control device of this invention connected with a throttle of an engine and with a clutch control of the engine.

Fig. 2 is a transverse vertical sectional view through the improved control device of the invention.

Fig. 3 is a vertical sectional view taken on line 3—3 of Fig. 2, the throttle lever shown being locked in idling or neutral position, and the clutch lever (not shown in this figure) being free for movement.

Fig. 4 is a vertical sectional view taken on line 4—4 of Fig. 2.

Fig. 5 is a view like Fig. 3, but showing the interlock mechanism in manually released position, whereby the clutch lever is locked in neutral position and the throttle lever is free to be moved.

Fig. 6 is a view like Figs. 3 and 5, but with the locking mechanism in position releasing the throttle lever, as effected by movement of the clutch lever to operative position.

Fig. 7 is a fragmentary horizontal section taken on line 7—7 of Fig. 3.

Referring to Figs. 1 through 3 the improved control device of this invention, as adapted for marine use, comprises a housing 20 of the type which may be readily mounted on the bridge of a vessel. Leading to the housing 20 is a push-pull cable 21 which is connected to a lever 22 of a clutch control valve 23 of the type commonly used with hydraulic reverse gears. As is well understood, the valve 23 may have four hydraulic connections 24, 25, 26 and 27 leading respectively to the pump, the "ahead" cylinder, the pump return or neutral, and the astern cylinder. The valve lever 22 is movable from a neutral position as shown in Fig. 1, in either of opposite directions to operative positions, as indicated by the arrows.

A second push-pull cable 28 leads to the housing 20 and is at its other end connected with a throttle lever 29 of an engine 30, the throttle lever 29 being capable of counterclockwise advancing movement as indicated by the arrow.

In accordance with the present invention, the housing 20 is provided with a clutch control member 31 and a throttle control member 32, both said members being movable on the housing 20, and being preferably in the form of levers which are pivotally mounted on opposite sides of the housing, extending upward therefrom and having handle portions 33 and 34 respectively, which are juxtaposed when the levers are upright. The upright positions of the levers 31 and 32 correspond to their neutral positions, wherein the clutch is disengaged and the throttle is at idling position. Both the control levers 31 and 32 are preferably movable in reverse directions from the neutral positions shown in Fig. 1, as indicated by the arrows.

Referring to Figs. 2 and 4, the clutch lever 31 is carried on a shaft 35 which extends into the housing 20 and at its inner end mounts a semicircular segment or sector 36 carrying at one extremity a fitting 37 connected with the actuating element 38 of the push-pull cable 21.

The throttle lever 32 is carried on a shaft 39 which extends into the casing 20 and at its inner end mounts a semicircular sector 30 having intermediate its ends a fitting 41 connected with the operating element 42 of the push-pull cable 28.

When the clutch lever 31 is shifted either forward or backward from the upright neutral position shown in Figs. 1, 2 and 4, it will swing the clutch valve lever 22 either to the left or to the right, causing the reverse gear of the engine (not shown) to be engaged in either reverse or ahead position. Also, when the throttle lever 32 is shifted either forward or backward from the neutral or idling position shown in Figs. 1, 2 and 3, it will cause the throttle lever 29 to be advanced.

The shafts 35 and 39 of the levers 31 and 32 are preferably substantially in alignment with each other, whereby the handle portions 33 and 34 of the levers follow semicircular paths extending alongside each other. Also, the upper parts of the levers 31 and 32 extend angularly inwardly or toward each other, to locate the handle portions 33 and 34 close to each other when the levers are upright, whereby both handle portions may be grasped by one hand and the levers operated simultaneously in the same directions, either toward or away from the operator for forward or astern operation respectively. This is of considerable advantage in a marine installation, in providing for quick maneuverability of the craft.

Adjustment of the clutch valve lever 22 and the throttle lever 29 may be so correlated that, in response to simultaneous single handed operation of the clutch and throttle levers 31 and 32, the clutch will be actuated prior to the engine attaining any speed substantially greater than its idling speed. Such adjustment is facilitated by the character of the connection means between the levers and the push-pull cable, incorporating the semi-circular sectors 36 and 40. For example, referring to Fig. 3, it will be seen that the initial movement of the throttle lever 32 will not cause any appreciable raising movement of the push-pull cable element 42. In sharp contrast to this, initial movement of the clutch member 31 will cause a relatively great raising or lowering movement of the push-pull cable element 38. Consequently, an advantageous relationship between the movements of the clutch valve and throttle levers 22 and 29 is attained, enabling one hand control of the levers 31 and 32 to be possible without imposing an undesirable load on the clutch, such as might be occasioned if the engine were speeded up to any considerable extent prior to the clutch being engaged.

In accordance with the present invention a novel interlock is provided between the clutch and throttle levers 31 and 32, whereby movement of the throttle lever from idling position is prevented until after the clutch lever has first been shifted to operative position, either ahead or astern. This interlock, referring to Figs. 1 and 2, comprises a blocking member in the form of an arm 43 having at one end a hub 44 carried by a shaft 45 passing through and bearing in the opposite sides 46 and 47 of the housing 20.

At its other end the arm 43 has a triangular, laterally offset portion 48 provided with a generally horizontal slot 49 having a notch 50 in the center of its lower edge. Adapted to occupy either the slot 49 or the notch 50 is a pin 51 carried by the sector 36 of the clutch lever 31. The inner end of the arm 43 also carries, laterally offset in the opposite direction, a semicircular portion 52 having a notch 53 in its lower edge at the center. Receivable in the notch 53 is a pin 54 carried by the sector 40 of the throttle lever 32. The sector 40 also carries a pair of lugs 55 adapted to travel along the outside of the semicircular portion 52 of the arm 43.

The various parts just described are so related that when the throttle and clutch levers are in their upright positions shown, the arm 43 of the interlock will be in the position shown in Figs. 2 and 3, with the pin 54 resting in the notch 53. This is the lowered position of the arm 43, and the arm is normally held in said lowered position by the force of gravity and also by a helical spring 56 carried on the shaft 45, Fig. 7. For these positions of the parts, the throttle lever 32 will be held locked in its upright idling position. The clutch lever 31 may be shifted either forward or backward, causing the pin 51 of the interlock mechanism to travel along the slot 49, and when the clutch lever has been shifted approximately 45° to either of its clutch-engaging positions, it will have caused the interlock arm 43 to be raised sufficiently to release the pin 54 from the notch 53. The throttle lever 32 may now be moved either forward or backward to speed up the engine as desired.

If the throttle lever should be shifted any appreciable distance out of its vertical idling position, as is the case when the engine speed is increased, one of the lugs 55 will be swung to a position underneath the semicircular portion 52 of the interlock, thereby preventing the interlock lever 43 from being lowered. As a consequence the clutch lever 31 will be held locked in its operative position, and cannot be brought to neutral position until the throttle lever 32 is first restored practically to its idling position. This is of considerable advantage in preventing inadvertent disengagement of the clutch and consequent racing of the engine with the throttle in advanced position.

If it should be desired to release the throttle lever 32, as for the purpose of warming up the engine prior to the clutch being engaged, this may be effected by manually releasing the interlock mechanism by applying downward pressure on either of two finger pieces 57, Figs. 1 and 3, carried by the ends of the shaft 45 on which the interlock arm 43 is mounted. Such downward pressure will raise the interlock arm 43 against the force of gravity and of the spring 56, and will separate the notch 53 from the pin 54 carried by the sector 40. This release of the throttle lever will, however, be accompanied by a locking of the clutch lever 31, since the pin 51 of the sector 36 will now be occupying the notch 50 in the triangular offset portion 48 of the arm 43. Thus the engine may be speeded up under the control of the throttle lever 32 without danger of the clutch being inadvertently engaged and causing damage to the clutch or transmission mechanism.

Reference is made to the fact that certain subject-matter illustrated and described herein is claimed in my copending application Serial No. 295,955, filed June 27, 1952, which application is a continuation in part hereof.

Variations and modifications may be made within the scope of the claims and portions of the improvements may be used without others.

I claim:

1. A combined clutch and throttle control device for use with an engine having a throttle, reverse gear and clutch means, comprising a base; manually operable clutch and throttle members mounted on said base, said clutch member being movable from a neutral position in either of opposite directions to either forward or reverse position and said throttle member being movable between idling and operating positions; means for connecting said members respectively to the clutch means and throttle to actuate the same; and locking means controlled by the clutch member, releasably locking the throttle member in idling position when the clutch member is in neutral position, said locking means releasing the throttle member whenever the clutch member is in forward or reverse position.

2. A combined clutch and throttle control device for use with an engine having a throttle, reverse gear and clutch means, comprising a base; manually operable clutch and throttle members mounted on said base and movable from neutral inoperative positions in either of opposite directions to either of two operative positions; means for connecting said members respectively to said clutch and throttle means to actuate the same; means controlled by the clutch member, releasably locking the throttle member in neutral position when the clutch member is in neutral, said means releasing the throttle member whenever the clutch member is in either of its operative positions; and means controlled by said throttle member when in operative position, locking the clutch member in operative position, said means releasing the clutch member when said throttle member is returned to neutral position.

3. A combined clutch and throttle control device for use with an engine having a throttle, reverse gear and clutch means, comprising a base; manually operable clutch and throttle members mounted on said base, said clutch member being movable from a neutral inoperative position in either of opposite directions to either of two operative positions and said throttle member being movable between a neutral and an operative position; means for connecting said one and other members respectively to the clutch means and throttle to actuate the same; means controlled by the clutch member, releasably locking the throttle member in neutral position when the clutch member is in neutral, said means releasing the throttle member whenever the clutch member is in either of its operative positions; and means under the control of said throttle member, locking said clutch member in either of its operative positions when the throttle member is out of its neutral position.

4. A combined clutch and throttle control device for use with an engine having a throttle, reverse gear and clutch means, comprising a base; manually operable clutch and throttle members mounted on said base, said clutch member being movable from a neutral inoperative position in either of opposite directions to either of two operative positions and said throttle member being movable between a neutral and an operative position; means for connecting said one and other memebrs respectively to the clutch means and throttle to actuate the same; means controlled by the clutch member, releasably locking the throttle member in neutral position when the clutch member is in neutral, said means releasing the throttle member whenever the clutch member is in either of its operative positions; means under the control of said throttle member, locking said clutch member in either of its operative positions when the throttle member is out of its neutral position; separate manually operable means for actuating said first-named locking means to release the said throttle member for movement from neutral position when the clutch member is in neutral; and means under the control of said throttle member, locking said clutch member in neutral position when the throttle member is out of its neutral position.

5. A combined clutch and throttle control device for use with an engine having a throttle, reverse gear and clutch means, comprising a base; manually operable clutch and throttle members mounted on said base, said clutch member being movable from a neutral inoperative position in either of opposite directions to either of two operative positions and said throttle member being movable between a neutral and an operative position; means for connecting said one and other members respectively to the clutch means and throttle to actuate the same; means controlled by the clutch member, releasably locking the throttle member in neural position when the clutch member is in neutral, said means releasing the throttle member whenever the clutch member is in either of its operative positions; manually operable means for actuating said locking means to release the said throttle member for movement from neutral position; and means under the control of said throttle member, locking said clutch member in neutral position when the throttle member is cut of its neutral position.

6. A combined cluch and throttle control device for use with an engine having a throttle, reverse gear and clutch means, comprising a base; manually operable clutch and throttle members mounted on said base, said clutch member being movable form a neutral inoperative position in either of opposite directions to either of two operative positions and said throttle member being movable between a neutral and an operative position; means for connecting said one and other members respectively to the clutch means and throttle to actuate the same; means controlled by the clutch member, releasably locking the throttle member in neutral position when the clutch member is in neutral, said means releasing the throttle member whenever the clutch member is in either of its operative positions; and manually operable means for actuating said locking means to release the said throttle member for movement from neutral position.

7. The invention as defined in claim 1 in which the locking means includes a blocking member movable on the base in reverse directions along a path crossing the paths of movement of the clutch and throttle members, and includes pin-and-slot connection means between said clutch and throttle members and the blocking member.

8. The invention as defined in claim 7 in which there is means, comprising a handle operatively connected with the blocking member, for actuating the locking means to release the throttle member for movement from neutral position.

9. A combined clutch and throttle control device for use with an engine having a throttle, reverse gear and clutch means, comprising a base; manually operable clutch and throttle levers mounted on said base and movable from neutral inoperative positions in either of opposite directions to either of two operative positions; means for connecting said levers respectively to said clutch and throttle means to actuate the same; a projection carried by the throttle lever; a second projection carried by the clutch lever; and means controlled by the projection of the clutch lever, releasably locking the projection of the throttle lever to hold the latter in neutral position when the clutch lever is in neutral, said means releasing the projection of the throttle lever whenever the clutch lever is in either of its operative positions.

References Cited in the file of this patent

UNITED STATES PATENTS

| | | |
|---|---|---|
| 708,724 | Merrick | Sept. 9, 1902 |
| 748,156 | Bement | Dec. 29, 1903 |
| 2,232,161 | Bode | Feb. 18, 1941 |
| 2,234,019 | Bragg | Mar. 4, 1941 |
| 2,326,796 | Panish | Aug. 17, 1943 |
| 2,358,094 | Panish | Sept. 12, 1944 |
| 2,366,020 | Good | Dec. 26, 1944 |
| 2,396,231 | Brill | Mar. 12, 1946 |
| 2,406,264 | Stevens | Aug. 20, 1946 |
| 2,493,592 | Peabody | Jan. 3, 1950 |
| 2,552,001 | Dugas | May 8, 1951 |